(12) United States Patent
de Lange et al.

(10) Patent No.: US 6,545,093 B1
(45) Date of Patent: Apr. 8, 2003

(54) HIGH MIXTURE-QUALITY BI-MODAL POLYETHYLENE BLENDS

(75) Inventors: Paulus de Lange, Limburgerhof (DE); Andreas Deckers, Flomborn (DE); Thomas Kessler, Schifferstadt (DE); Wolfgang Rohde, Speyer (DE); Thomas Blümel, Rodenbach (DE); Martin Lux, Dannstadt-Schauernheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 09/806,584

(22) PCT Filed: Oct. 14, 1999

(86) PCT No.: PCT/EP99/07748

§ 371 (c)(1),
(2), (4) Date: Apr. 2, 2001

(87) PCT Pub. No.: WO00/24821

PCT Pub. Date: May 4, 2000

(30) Foreign Application Priority Data

Oct. 27, 1998 (DE) .......................................... 198 49 426

(51) Int. Cl.⁷ ........................... C08L 23/04; C08L 23/06
(52) U.S. Cl. ...................................... 525/191; 525/240
(58) Field of Search ................................. 525/191, 240

(56) References Cited

U.S. PATENT DOCUMENTS 4,438,238 A  3/1984  Fukushima et al.
5,350,807 A  9/1994  Pettijohn
6,194,520 B1 *  2/2001  Cheruvu et al. ............ 525/240

FOREIGN PATENT DOCUMENTS

| EP | 100 843 | 2/1984 |
| EP | 533 154 | 3/1993 |
| EP | 533 155 | 3/1993 |
| EP | 533 156 | 3/1993 |
| EP | 533 160 | 3/1993 |
| EP | 848036 | 6/1998 |
| WO | 96/14358 | 5/1996 |

OTHER PUBLICATIONS

Adv.Materials,234–238 (1992) Bähm et al.

* cited by examiner

Primary Examiner—Nathan M. Nutter
(74) Attorney, Agent, or Firm—Keil & Weinkauf

(57) ABSTRACT

Bimodal polyethylene blends are made from a high-molecular-weight ethylene copolymer and a low-molecular-weight ethylene homo- or copolymer and have a melt flow rate MFR 190/21.6 of from 6 to 14 g/10 min, a density of from 0.94 to 0.97 g/cm³, an environmental-stress-cracking resistance ESCR>150 h and a value of less than 3 when the quality of blending in the blend is measured to ISO 13949. A process prepares polyethylene blends of this type by melting and homogenization in a mixing apparatus and discharge via a gear pump. The blends are used to produce moldings, in particular hollow articles and pressure pipes.

9 Claims, No Drawings

HIGH MIXTURE-QUALITY BI-MODAL POLYETHYLENE BLENDS

The present invention relates to bimodal polyethylene blends made from a high-molecular-weight ethylene copolymer and a low-molecular-weight ethylene homo- or copolymer and having a melt flow rate MFR 190/21.6 of from 6 to 14 g/10 min, a density of from 0.94 to 0.97 g/cm$^3$, an environmental-stress-cracking resistance ESCR>150 h and a value of less than 3 when the quality of blending in the blend is measured to ISO 13949. It further relates to a process for preparing polyethylene blends of this type by melting and homogenization in a mixing apparatus and discharge via a gear pump, and also to the use of these for producing moldings, in particular hollow articles and pressure pipes.

Higher requirements are constantly being placed upon the mechanical load-bearing capability of polyethylene moldings. In particular, there is a requirement for highly environmental-stress-cracking-resistant, impact-resistant and rigid products, which are particularly suitable for the production of hollow articles, and also of pressure pipes. The requirement for simultaneous good environmental-stress-cracking resistance and stiffness is not easy to meet, since these are contradictory properties. While stiffness increases with the density of the polyethylene, environmental-stress-cracking resistance decreases as density increases.

For hollow articles and pressure pipes it has therefore proven advantageous to use blends made from a high-molecular-weight, low-density ethylene copolymer and a low-molecular-weight, high-density ethylene homopolymer, described, for example, by L. L. Böhm et al., Adv. Mater. 4, (1992), 234–238. Similar polyethylene blends are disclosed in EP-A 100 843, EP-A 533 154, EP-A 533 155, EP-A 533 156, EP-A 533 160 and U.S. Pat. No. 5,350,807.

However, the properties of bimodal polyethylene blends are not solely dependent on the properties of the components. Particularly for the mechanical properties of the blends, a decisive role is played by the quality of blending of the high-with the low-molecular-weight compound, and also with any other additives present, such as color pigments or processing aids. Poor quality of blending causes, inter alia, low environmental-stress-cracking resistance, and impairs the creep performance of pressure pipes made from polyethylene blends.

The quality of blending in polymer blends can be checked by examining thin sections (microtome sections) of a specimen using an optical microscope. Inhomogeneity is visible here as specks or white spots. The specks or white spots are predominantly high-molecular-weight, high-viscosity particles in a low-viscosity matrix (see, for example, U. Burkhardt et al. in "Aufbereiten von Polymeren mit neuartigen Eigenschaften", VDI-Verlag, Düsseldorf 1995, p. 71). The size of inclusions of this type may be up to 300 μm. They can cause environmental stress cracking and brittle failure of components. As the quality of blending in a blend improves, the number of these inclusions observed falls and their size reduces. In quantitative terms the quality of blending in a blend is determined to ISO 13949. The test specification requires a microtome section to be prepared from a specimen of the blend and the number and size of these inclusions to be counted, and an evaluation system is given for grading the quality of blending in the blend.

An important application for bimodal polyethylene blends is the production of pressure pipes for conveying gas, drinking water and waste water. Pressure pipes made from polyethylene are increasingly replacing metal pipes. An important factor in applications of this type is very long service life of the pipe, without fear of aging or brittle failure. Even small defects or indentations in a pressure pipe can grow, even at low pressures, and cause brittle failure. This process can be accelerated by temperature increase and/or aggressive chemicals. It is therefore extremely important to reduce, as far as is at all possible, the number and size of defects, such as specks or white spots, in a pipe.

For conveying drinking water a further important factor is that the blend has very low odor and is very taste-neutral.

To prepare bimodal polyethylene blends use is made of reactor cascades, i.e. two or more polymerization reactors arranged in series. The low-molecular-weight component is polymerized in one reactor and the high-molecular-weight component in the next (see, for example, M. Rätzsch, W. Neiβl "Bimodale Polymerwerkstoffe auf der Basis von PP und PE" in "Aufbereiten von Polymeren mit neuartigen Eigenschaften" pp. 3–25, VDI-Verlag, Düsseldorf 1995). Mixing of the polyethylenes of different molar mass distribution and chemical composition has already taken place here within the polymer granules. However, a disadvantage of this process is that the same catalyst has to be used in each reactor of the cascade. High equipment costs are necessary to ensure that comonomers added in one reactor or hydrogen added as regulator do not pass into the next reactor. In addition, it is difficult to adjust the polymerization rate of each reactor to give the desired composition of the blend.

The most familiar process for preparing polymer blends in general is the intimate mixing of individual components, for example by melt extrusion in an extruder or kneader (see, for example, "polymer Blends" in Ullmann's Encyclopedia of Industrial Chemistry, 6$^{th}$ Edition, 1998, Electronic Release). An advantage of this method over the reactor cascade for preparing bimodal polyethylene blends of the type described is that its flexibility is greater, and the components of the blend may therefore also have been derived from a variety of processes. However, in other respects there are particular difficulties with this method. The melt viscosities of the high- and of the low-molecular-weight component of a bimodal polyethylene blend are extremely different. Whereas at the usual temperatures for preparing the blends, from about 190 to 210° C., the low-molecular-weight component has already almost become a low-viscosity liquid, the high-molecular-weight component is only softened ("lentil soup"). It is therefore very difficult to mix the two components homogeneously. In addition, it is known that the high-molecular-weight component can easily be degraded by thermal stress or by shear forces in the extruder, impairing the properties of the blend. To avoid this the use of gear pumps to aid discharge has been proposed (see, for example, W. Gerber in "Optimierung des Compoundierprozesses durch Rezeptur- und Verfahrensverständnis" VDI-Verlag, Düsseldorf, 1997, pp. 253–280).

It is an object of the present invention to provide a bimodal polyethylene blend with improved quality of blending and suitable for producing pressure pipes. Another object of the invention was to provide a cost-effective and flexible process for preparation of a blend of this type under mild conditions from a high-molecular-weight and a low-molecular-weight component.

We have found that this object is achieved by means of bimodal polyethylene blends made from a high-molecular-weight ethylene copolymer and a low-molecular-weight ethylene homo- or copolymer and having a melt flow rate MFR 190/21.6 of from 6 to 14 g/10 min, a density of from 0.94 to 0.97 g/cm$^3$, an environmental-stress-cracking resistance ESCR>150 h and a value of less than 3 when the quality of blending in the blend is measured to ISO 13949. A process for preparing polyethylene blends of this type by melting and homogenization in a mixing apparatus and discharge via a gear pump has also been found, as has the use of the blends for hollow articles and pressure pipes.

The density of the novel bimodal polyethylene blend is from 0.94 to 0.97 g/cm$^3$, preferably from 0.95 to 0.97 g/cm$^3$ and very particularly preferably from 0.95 to 0.96 g/cm$^3$. The melt flow rate MFR 190/21.6 is from 6–14 g/10 min. If the melt flow rate is greater than 14 g/10 min the environmental-stress-cracking resistance is no longer adequate for pressure pipes, and if the melt flow rate is less than 6 it is very difficult to process the blend to give pipes. The melt flow rate is preferably from 8 to 12 g/10 min and very particularly preferably from 9 to 11 g/10 min. The environmental-stress-cracking resistance of the blend is at least 150 h, preferably at least 200 h. The value obtained when the quality of blending in the bimodal polyethylene blend is measured to ISO 13949 is less than 3, preferably less than 2.5.

The novel polyethylene blend comprises two components.

The low-molecular-weight component is composed of an ethylene homopolymer or ethylene copolymer with a weight-average molar mass of from 8000 to 80,000 g/mol, preferably from 20,000 to 70,000 g/mol and very particularly preferably from 30,000 to 60,000 g/mol. Its polydispersity $M_w/M_n$ is from 2.5 to 12, preferably from 3 to 10 and very particularly preferably from 5 to 8.

The low-molecular-weight component may also comprise comonomers alongside the ethylene. The selection of the comonomer depends on the properties desired. However, preference is given to the use of 1-olefins as comonomers, particularly preferably propene, 1-butene, 1-pentene, 1-hexene, 1-octene or 4-methylpentene. The selection of the amount of comonomer used also depends on the properties desired, but is preferably not more than 1 mol %, based on the amount of all of the monomers used.

The melt flow rate MFR 190/2.16 of the low-molecular-weight ethylene homopolymer or ethylene copolymer is preferably from 20 to 100 g/10 min and particularly preferably from 25 to 40 g/10 min. Its density is preferably above 0.95 g/cm$^3$. It may be prepared by any of the methods known to the person skilled in the art. However, the low-molecular-weight component is preferably prepared in the presence of a chromocene catalyst on an oxidic support. An advantage of this preparation method over preparation with Ziegler catalyst is that there is no need to use low-molecular-weight organoaluminum compounds as cocatalyst.

Highly volatile, low-molecular-weight organoaluminum compounds or their decomposition products can adversely affect the odor of the resultant polyethylene, and thus of the blend.

The high-molecular-weight component is composed of an ethylene copolymer with a weight-average molar mass $\geq$ 300,000 g/mol, preferably from 350,000 to 700,000 g/mol and very particularly preferably from 400,000 to 600,000 g/mol. The selection of the comonomer used alongside the ethylene depends on the properties desired. However, preference is given to the use of 1-olefins as comonomers, particularly preferably propene, 1-butene, 1-pentene, 1-hexene, 1-octene or 4-methylpentene. The selection of the amount of comonomer used likewise depends on the properties desired. However, preference is given to amounts of from 0.2 to 4.0 mol %, based on the amount of all of the monomers used. The polydispersity $M_w/M_n$ is from 1 to 10, preferably from 3 to 9 and very particularly preferably from 5 to 9.

The melt flow rate MFR 190/21.6 of the high-molecular-weight ethylene copolymer is preferably not greater than 1.5 g/10 min and particularly preferably from 0.5 to 1.5 g/10 min. Its density is preferably not above 0.93 g/cm$^3$. The high-molecular-weight ethylene copolymer is preferably prepared by polymerization of the monomers in the presence of a Ziegler catalyst.

The novel blends comprise from 40 to 80% by weight of the high-molecular-weight component and from 20 to 60% by weight of the low-molecular-weight component. They preferably comprise from 40 to 60% by weight of the high-molecular-weight and from 60 to 40% by weight of the low-molecular-weight component. They may also, furthermore, comprise up to 10% by weight of other components, such as antioxidants, UV stabilizers, dyes or color pigments and/or preparations made from these, antistats or processing aids, all of which are known per se.

The novel blends may be prepared in mixing apparatuses which have been equipped with a gear pump as a discharge system. Examples of mixing apparatuses of this type are single- or twin-screw extruders or kneaders, Ko-Kneaders or continuous kneaders. The person skilled in the art may select the screw configuration of these devices depending on the blend properties desired. However, care should be taken that the blend is not subjected to excessive mechanical load resulting in degradation of the high-molecular-weight component and therefore impairment of the mechanical properties of the blend. The two components of the blend are fed in separately via two feeds. Other components, e.g. color pigments or preparations of color pigments in polyethylene, may, if desired, be fed in via a third feed. A decisive factor for the novel process is the use of a gear pump as discharge system. Surprisingly, the use of a gear pump not only inhibits thermomechanical degradation of the high-molecular-weight component of the blend, discernible in an increased melt flow rate, but, unexpectedly for the person skilled in the art, also markedly improves the quality of blending in the blend.

Due to their high quality of blending, good environmental-stress-cracking resistance and high impact strength, the novel blends are highly suitable for producing films and moldings, in particular hollow articles and pressure pipes.

The following examples describe the invention in more detail but are not intended to restrict its scope.

The values given were determined as follows:

| | |
|---|---|
| Density | to ISO 1183 |
| Melt flow rate MFR 190/21.6 or MFR 190/2.16 | to ISO 1133 |
| Weight-average molecular weight $M_w$, and polydispersity $M_w/M_n$ | based on DIN 55672 with polyethylene standards |
| Environmental-stress-cracking resistance ESCR | Disc-shaped test specimens (diameter 40 mm, thickness 2 mm, with an indentation of depth 0.1 mm and length 20 mm cut into one side) are immersed in 1% Nekanil solution at 80° C. and subjected to a pressure of 3 bar. The time taken for environmental stress cracks to appear is measured (and given in h). |
| Quality of blending in the blend | to ISO 13949 6 microtome sections (thickness > 60 μm, diameter from 3 to 5 mm) are prepared from 6 different parts of a specimen of the blend. The sections are examined under the microscope at 100 times magnification to determine the |

-continued number and size of inclusions ("white spots", agglomerates, particles) in an area of 0.7 mm². Inclusions of size less than 5 µm are ignored, as in ISO 13949. The classification table in ISO 13949 is used to award the grade 0, 0.5, 1, 1.5, 2, 2.5, 3, 3.5, 4, 4.5, 5, 5.5, 6, 6.5 or 7, depending on the number and size of the inclusion. The overall grade is calculated from the arithmetic average of the grades from all 6 of the specimens. Lower/mean grades being fewer inclusions present in the blend and thus higher quality of blending in the blend.

The following starting materials were used for the examples below:

| High-molecular-weight polyethylene component: | Melt flow rate MFR 190/21.6 | 0.8 g/10 min |
| --- | --- | --- |
| | $M_w$ | 537,000 g/mol |
| | $M_w/M_n$ | 6.8 |
| | Density | 0.924 g/cm³ |
| Low-molecular-weight polyethylene component: | Melt flow rate MFR 190/2.16 | 30 g/10 min |
| | $M_w$ | 57,000 g/mol |
| | $M_w/M_n$ | 6.5 |
| | Density | 0.967 g/cm³ |
| Pigment preparation: | 40% carbon black, amorphous, dispersed in polyethylene (grade: RKK 40/P 0.1 IRG –5032 L, Degussa) | |

The high-molecular-weight component was prepared using a Ziegler catalyst, and the low-molecular-weight component using a supported chromocene catalyst.

Each experiment used 50% strength by weight of the high-molecular-weight component, 45% by weight of the low-molecular-weight component and 5% of the pigment preparation. Processing in the experiments was carried out at 200° C.

The results are listed in Tables 1 and 2.

The examples and comparative examples show that the use of a gear pump can raise the quality of blending in polyethylene blends, and their environmental-stress-cracking resistance. Although the use of a screen in the discharge area of a twin-screw extruder gives improved quality of blending in the bimodal polyethylene blend, degradation of the high-molecular-weight component occurs. Melt flow rate therefore increases markedly and environmental-stress-cracking resistance reduces markedly, and the blend obtained no longer has mechanical properties adequate for pressure pipes.

TABLE 1

Results of the blend experiments in equipment with a gear pump

| | Machine type | Through-put [kg/h] | Energy supplied per unit [kWh/kg] | Melt flow rate MFR 190/21.6 [g/10 min] | Density [g/cm³] | Environmental-stress-cracking resistance ESCR [h] | Quality of blending to ISO 13949 |
| --- | --- | --- | --- | --- | --- | --- | --- |
| Example 1 | Twin-screw kneader* + gear pump | 50 | 0.224 | 9.3 | 0.955 | >200⁺ | 2.8 |
| Example 2 | Continuous mixer** + gear pump | 200 | 0.250 | 10 | 0.956 | >200⁺ | 2.4 |
| Example 3 | Continuous mixer** + gear pump | 175 | 0.316 | 11.5 | 0.954 | >200⁺ | 2.0 |

*ZSK 40 (Werner & Pfleiderer),
**4" UMSD (Farrel),
⁺Experiment was terminated after 200 h

TABLE 2

Results of blend experiments in equipment without a gear pump

| | Machine type | Through-put [kg/h] | Energy supplied per unit [kWh/kg] | Melt flow rate MFR 190/21.6 [g/10 min] | Density [g/cm³] | Environmental-stress-cracking resistance ESCR [h] | Quality of blending to ISO 13949 |
| --- | --- | --- | --- | --- | --- | --- | --- |
| Comparative Example 4 | Twin-screw kneader* | 80 | 0.315 | 16.7 | 0.955 | 22 | 3.7 |
| Comparative Example 5 | Twin-screw kneader** | 70 | 0.393 | 11 | 0.953 | 148 | 4.5 |
| Comparative Example 6 | Twin-screw kneader** with 63 µm-screen | 60 | 0.467 | 32 | 0.956 | 3 | 2.8 |

TABLE 2-continued

Results of blend experiments in equipment without a gear pump

| | Machine type | Through-put [kg/h] | Energy supplied per unit [kWh/kg] | Melt flow rate MFR 190/21.6 [g/10 min] | Density [g/cm$^3$] | Environmental-stress-cracking resistance ESCR [h] | Quality of blending to ISO 13949 |
|---|---|---|---|---|---|---|---|
| Comparative Example 7 | Twin-screw kneader*** | 40 | 0.235 | 14.3 | 0.958 | 47 | 4.8 |
| Comparative Example 8 | Twin-screw kneader*** | 60 | 0.228 | 15.6 | 0.954 | 10 | 5.2 |

*ZSK 53 (Werner & Pfleiderer) (long)
**ZSK 53 (short)
***FTX80 (Farrel)

We claim:

1. A bimodal polyethylene blend with a melt flow rate MFR 190/21.6 of from 6 to 14 g/10 min, a density of from 0.94 to 0.97 g/cm$^3$ and an environmental-stress-cracking resistance ESCR>150 h, comprising
   from 40 to 80% by weight of a high-molecular-weight ethylene copolymer with a weight-average molar mass≧300,000 g/mol and a polydispersity $M_w/M_n$ of from 1–12, and
   from 20 to 60% by weight of a low-molecular-weight ethylene homo- or copolymer with a weight-average molar mass of from 8000 to 80,000 g/mol and a polydispersity $M_w/M_n$ of from 2.5 to 12,
where measurement to ISO 13949 of the quality of blending in the blend gives a value of less than 3.

2. A bimodal polyethylene blend as claimed in claim 1, wherein the high-molecular-weight ethylene copolymer comprises a proportion of from 0.2 to 4.0 mol % of comonomer and the low-molecular-weight ethylene homo- or copolymer comprises a proportion of from 0 to 1 mol % of comonomer, based in each case on the total amount of all of the monomers used, and wherein the comonomer is at least one comonomer selected from the class consisting of propene, 1-butene, 1-pentene, 1-hexene, 1-octene and 4-methylpentene.

3. A bimodal polyethylene blend as claimed in claim 2, wherein the high-molecular-weight ethylene copolymer is obtained by polymerization in the presence of a Ziegler catalyst and the low-molecular-weight ethylene homo- or copolymer is obtained by polymerization in the presence of a chromocene catalyst on an oxidic support.

4. A bimodal polyethylene blend as claimed in claim 3, wherein the high-molecular-weight ethylene copolymer has a melt flow rate MFR 190/21.6≦1.5 g/10 min and the low-molecular-weight ethylene homo- or copolymer has a melt flow rate MFR 190/2.16 of from 20 to 100 g/10 min.

5. A bimodal polyethylene blend as claimed in claim 3, wherein the high-molecular-weight ethylene copolymer has a density of ≦0.93 g/cm$^3$, and the low-molecular-weight ethylene homo- or copolymer has a density of ≧0.95 g/cm$^3$.

6. A process for preparing a bimodal polyethylene blend which comprises feeding a high-molecular-weight ethylene copolymer and a low-molecular-weight ethylene homo- or copolymer separately into a mixing apparatus, melting both components, homogenizing them, and discharging them via a gear pump from the mixing apparatus for pelletization, and wherein the bimodal polyethylene blend has a melt flow rate MFR 190/21.6 of from 6 to 14 g/10 min, a density of from 0.94 to 0.97 g/cm$^3$ and an environmental-stress-cracking resistance ESCR>150 h, and comprises
   from 40 to 80% by weight of a high-molecular-weight ethylene copolymer with a weight-average molar mass≧300,000 g/mol and a polydispersity $M_w/M_n$ of from 1 to 12, and
   from 20 to 60% by weight of a low-molecular-weight ethylene homo- or copolymer with a weight-average molar mass of from 8000 to 80,000 g/mol and a polydispersity $M_w/M_n$ of from 2.5 to 12,
where measurement to ISO 13949 of the quality of blending in the blend gives a value of less than 3.

7. A film or a molding produced from a bimodal polyethylene blend having a melt flow rate MFR 190/21.6 of from 6 to 14 g/10 min, a density of from 0.94 to 0.97 g/cm$^3$ and an environmental-stress-cracking resistance ESCR>150 h, and comprising
   from 40 to 80% by weight of a high-molecular-weight ethylene copolymer with a weight-average molar mass≧300,000 g/mol and a polydispersity $M_w/M_n$ of from 1 to 12, and
   from 20 to 60% by weight of a low-molecular-weight ethylene homo- or copolymer with a weight-average molar mass of from 8000 to 80,000 g/mol and a polydispersity $M_w/M_n$ of from 2.5 to 12,
where measurement to ISO 13949 of the quality of blending in the blend gives a value of less than 3.

8. The molding defined in claim 7 which is in form of a hollow article or a pressure pipe.

9. The bimodal polyethylene blend defined in claim 1, wherein the ESCR value is determined by
   (a) providing a disk-shaped test specimen consisting of the polyethylene blend which specimen has a diameter of 40 mm, a thickness of 2 mm,
   (b) providing an indentation having a depth on 0.1 mm and a length of 20 mm on one face of the disk-shaped specimen,
   (c) subsequently immersing the indented specimen in a 1% Nekanil solution at a temperature of 80° C.,
   (d) subjecting the immersed specimen to a pressure of 3 bar, and
   (e) lastly measuring the time which passes until environmental stress cracks appear in the specimen at the temperature of 80° C. and under load of the pressure of 3 bar.

* * * * *